W. J. MACKLE.
METHOD OF RIVETING.
APPLICATION FILED APR. 21, 1917.

1,253,850.

Patented Jan. 15, 1918.

INVENTOR:
William J. Mackle,
BY
Hugh K. Wagner,
ATTORNEY

UNITED STATES PATENT OFFICE.

WILLIAM J. MACKLE, OF ST. LOUIS, MISSOURI.

METHOD OF RIVETING.

1,253,850.  Specification of Letters Patent.  Patented Jan. 15, 1918.

Application filed April 21, 1917. Serial No. 163,625.

*To all whom it may concern:*

Be it known that I, WILLIAM J. MACKLE, a citizen of the United States, residing at the city of St. Louis, in the State of Missouri, have invented certain new and useful Improvements in Methods of Riveting, of which the following is a specification.

This invention consists in an improved method of riveting metal plates or the like together, and has for its object the economy of labor and material in the process.

In the accompanying drawings forming part of this specification and in which like numbers of reference denote like parts wherever they occur, Figure 1 is a sectional view showing a hollow temporary rivet of this invention just after it has been inserted in a rivet hole through the pair of plates, which plates are, also, shown in section;

Figures 1, 2, 3, 4, 5:
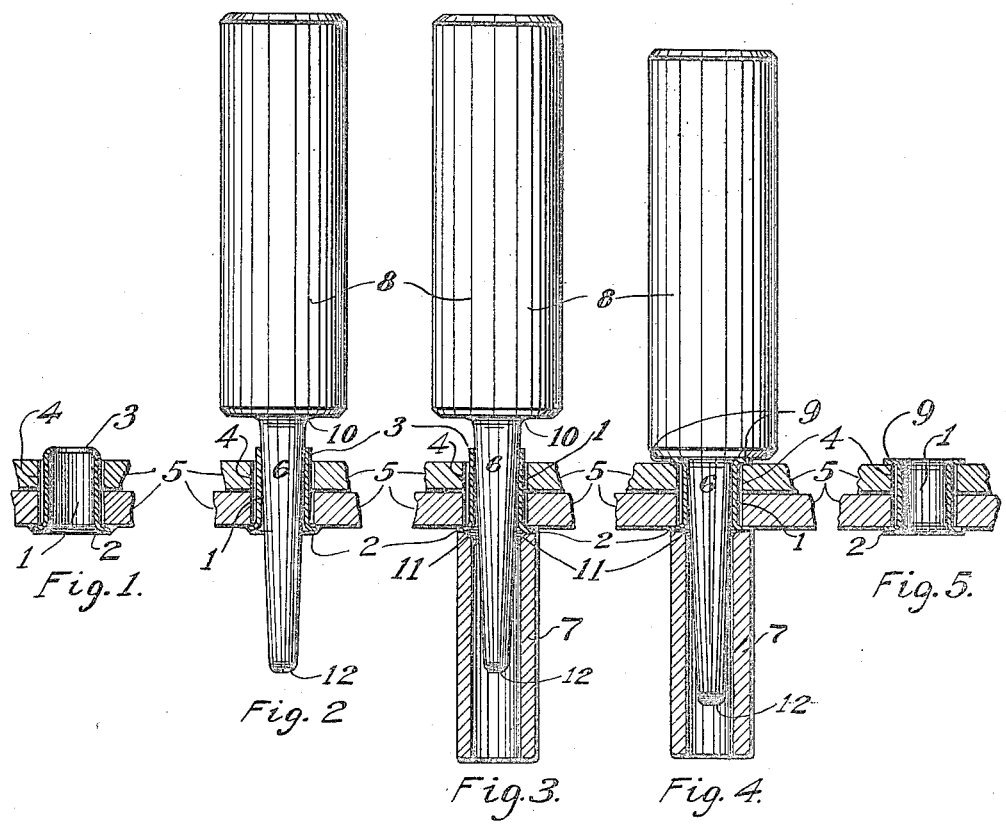
Fig. 2 shows the same with a drift inserted through the said hollow rivet.
Fig. 3 shows the same as Fig. 2 with a backing-bar or anvil telescoping the point of the said drift.
Fig. 4 shows the same as Fig. 3 after a hammer blow has swaged or flanged the initially unflanged end of the said hollow rivet.
Fig. 5 illustrates the pair of plates of Fig. 1 held together by the hollow rivet of Fig. 1 after the same has been upset.

Riveting as now practised involves waste of material and much waste of time. This time is money, as it appears in the pay-roll.

The method of riveting in common use is for holes adapted to register to be punched or drilled in suitable places through the metal parts to be joined; then to ream the said holes; then through some of the said holes to insert relatively small bolts and to screw up the nuts thereon until they bind the metal parts together; then to insert red-hot rivets and upset their ends; then to remove the bolts used for temporary binding of the parts together by knocking off their nut ends and allowing the same to drop out of their holes and to be wasted; then to ream the said holes from which the bolts are removed; and then to insert rivets therein in the usual manner. In some instances small stove bolts are used for thus temporarily holding the metal plates, and as they are easily frangible by a hammer blow, it is quicker and, therefore, cheaper to break off their nuts than to unscrew their nuts; but in some instances larger bolts are used which can not be so readily broken, and when that is the case it is necessary to take the time to unscrew the nuts therefrom, but these bolts are, also, soon thrown away, because their threads become jagged or burred by use, which interferes with their rapid insertion in the rivet holes. The reason why the rivet holes in which the temporary binding bolts are placed are reamed after the removal of the said bolts is that the said bolts must be in their holes while the other holes in the plates are being reamed. The bolts that are used for temporary binding, as just described, are received in the shops where they are used each with its nut thereon (this being for the convenience of the workmen and the assurance that each bolt will have an appropriate nut) and in the present practice of assembling the parts for fabrication into a structure, the first step after bringing the parts to be riveted adjacent to each other with proper holes registering is to unscrew each nut from its bolt, whereupon the bolt is inserted through the pair of registering holes for which it is intended, and then the nut is screwed home upon the same again.

The hereinafter-described hollow rivets are cheaper than the cheapest bolts used for such temporary binding, and their use according to the method hereinafter described economizes much time as compared to the method of riveting when such bolts are used. The bolts at present used must be of smaller diameter than the holes they enter, and this renders it necessary to use means other than the said bolts to make the holes register before these bolts are screwed up tight. The insertion of a drift in one of these hollow rivets when in place causes the holes through which it passes to register.

In following the process of this invention, the above-mentioned temporary binding bolts are not used, but in lieu thereof a hollow rivet 1, having a flange 2 at one end and a rounded nose 3 at its opposite or entrance end, is inserted through a hole 4 that runs through a plurality of plates or metal parts 5. Such holes are ordinary rivet holes like the holes 4 in Fig. 7, of which a suitable number will be present punched or drilled through each of the parts to be joined, such holes in the different parts more or less closely alining or registering with each other.

Figures 6, 7:
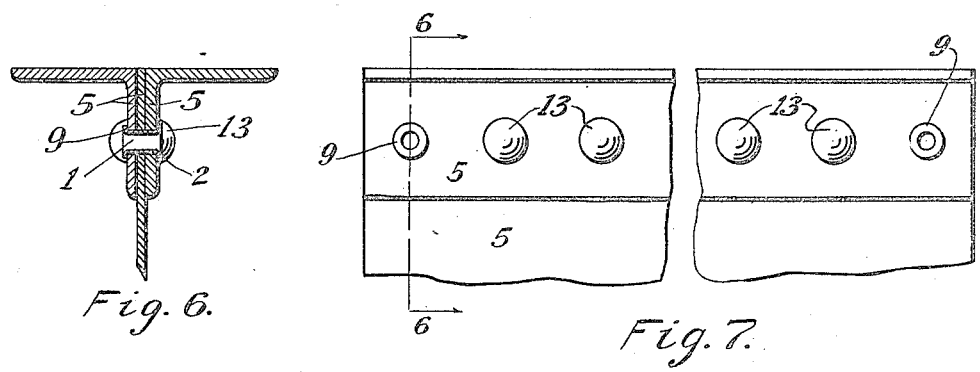
Figs. 6 and 7 illustrate an additional form of metal construction which, for example, may be temporarily, for riveting purposes, connected by this invention, Fig. 6 being a section on the line 6—6 in Fig. 7.

To hold the metal plates or parts with appropriate holes therein registering, so that the said parts can be riveted together in the desired manner, hollow rivets 1 will be inserted at opposite ends or the sides or corners of the work, as indicated in Fig. 7, and in as many places and in such numbers as will sufficiently bind the work temporarily together while the same is being fabricated into steel structure or the like by the process of riveting. In this function of temporarily binding together the parts to be riveted, the hollow rivets 1 serve as substitutes for the above-mentioned stove bolts or other binding bolts.

In practice a helper workman will insert one of these hollow rivets in a hole 4; through the same will be promptly inserted by another workman a drift 6 (as shown in Fig. 2), which will be immediately capped by a backing-bar or anvil 7 (as shown in Fig. 3); and then, with the backing-bar bearing against the flange 2 of the hollow rivet 1, a hammer blow or the like upon the handle 8 of the drift 6 forces the same home to the position shown in Fig. 4 and produces the tying result shown in Figs. 5 and 6, wherein the swaged or upset edge 9 of the hollow rivet 1 forms a flange at the end thereof opposite to flange 2. The entrance of the drift 6 within the lip or nose 3 spreads the same upright (as shown in Figs. 2 and 3). It will be observed that the drift is preferably provided with a rounded part 10 which spreads the nose or entrance end 3 of the hollow rivet 1 and prepares it for the formation of the flange 9. The rounded nose 3 of the hollow rivet 1 assists its quick and ready entrance into the hole 4. The mouth 11 of the backing-bar 7 is rounded, and the point 12 of drift 6 is, also, rounded, so as to expedite the capping by bar 7 of drift 6. The form of the drift may be varied, and curve 10 may be substituted by other spreading means.

After the plates or other parts 5 have been attached in the temporary manner shown in Figs. 5 and 6 by the upsetting of hollow rivets 1, as herein described, located at as many suitable points in the work as may be necessary, rivets 13 are inserted one after the other in all the other holes that have been prepared in the parts to be joined, and such rivets are upset or swaged in the usual manner.

After that, a reamer is run through each hollow rivet that has been used for temporary attachment, and the reamer away from its point is of such size as in one operation to remove the hollow rivet 1 and suitably to ream the hole 4 to proper size for its solid rivet. In the original preparation of each plate by punching or drilling holes therein, each hole is usually made smaller than the ultimate requirement, so as to allow for reaming and thus the making of a true clean hole for a hot rivet. These hollow rivets when they have performed their function can be expanded by driving a drift through the center and thus made large enough for the entrance of a solid rivet without going through the process of reaming.

It will be seen by looking more particularly at Figs. 2 and 3 that the hollow rivet 1 extends farther than through the parts 5 to be attached, while flange 2 acts as a stop.

The hollow rivets 1 can be made of pressed steel of quite light gage, although its thickness will depend upon the weight of the parts to be held thereby, and the diameter and length of rivets 1 will depend upon the number, weight, kind, and thickness of the parts to be joined. The cost of hollow rivets 1 is very much less than that of the usual bolts, and time-sheets and pay-rolls in actual use of the method herein described have been found to be much lower than when such bolts are used for temporary tying.

Having thus described the said invention, I hereby reserve the benefit of all changes in form, arrangement, order, or use of parts, as it is evident that many minor changes may be made therein without departing from the spirit of this invention or the scope of the following claim.

I claim:

The herein-described method of riveting, consisting in bringing together perforated parts so that the perforations therein will register; then in one such perforation inserting a hollow rivet flanged at one end; then inserting at the unflanged end of such rivet a swaging instrument and passing the same through the said hollow rivet; then applying an anvil to the said flange; then upsetting the unflanged edge of the said hollow rivet by advancing the said swaging instrument and completing the swaging thereof by blows upon the said swaging instrument; then repeating the said operations with another hollow rivet in another such perforation or with a plurality of such rivets in suitable positions; then reaming the other perforations in the said parts to be attached;

then inserting an ordinary or solid rivet in each of the said other perforations and upsetting the small end thereof in the usual way; then reaming each perforation containing a hollow rivet, the said reaming being done to a size larger than the said hollow rivet; and then inserting an ordinary or solid rivet in each of the said last-mentioned perforations and upsetting the small end thereof in the usual way.

In testimony whereof I hereunto affix my signature.

WILLIAM J. MACKLE.

Copies of this patent may be obtained for five cents each, by addressing the "Commissioner of Patents, Washington, D. C."